United States Patent

[11] 3,611,975

| [72] | Inventor | Clifford Logan Ashbrook<br>5077 Cheena, Houston, Tex. 77036 |
|---|---|---|
| [21] | Appl. No. | 850,555 |
| [22] | Filed | Aug. 15, 1969 |
| [45] | Patented | Oct. 12, 1971 |

[54] PARAVANE DEVICE
8 Claims, 8 Drawing Figs.

[52] U.S. Cl. ................................................ 114/235 B,
340/7
[51] Int. Cl. ..................................................... B63b 21/56,
B63b 17/00
[50] Field of Search .......................................... 114/235,
235.2; 340/7

[56] References Cited
UNITED STATES PATENTS
| 3,380,424 | 4/1968 | Bowken et al. ................. | 114/235.2 |
| 3,434,446 | 3/1969 | Cole ............................... | 114/235.2 |
| 3,440,992 | 4/1969 | Chance ........................... | 114/235.2 |
| 3,375,800 | 4/1968 | Cole et al. ...................... | 114/235 B |

Primary Examiner—Trygve M. Blix
Attorney—John C. Stahl

ABSTRACT: A paravane for maintaining a seismic cable being towed through the water at a predetermined distance above the water floor. The paravane includes a cylindrical body characterized by diametrically opposed wing members actuated by an air pressurized piston which moves the wing members into an ascending or descending position. Predetermined operating depths of the paravane is accomplished by resisting spring means acting in opposition to movement of the pressurized piston. The diving depth of the device may be varied by adjustment of the resisting means and air pressure so as to accomplish uniform depth control of all the paravanes which are connected to the seismic cable.

3,611,975

Clifford Logan Ashbrook
INVENTOR

BY   Bernard A. Reiter
ATTORNEY

Clifford Logan Ashbrook
INVENTOR

BY   Bernard A. Reiter
ATTORNEY

Clifford Logan Ashbrook
INVENTOR

BY Bernard A. Reiter
ATTORNEY

PARAVANE DEVICE

BACKGROUND OF THE INVENTION

1. Field of the Invention

This invention relates to an improved paravane device for maintaining a seismic cable being towed through the water at a predetermined depth.

2. Description of the Prior Art

Detectors or hydrophones used in marine seismic operations heretofore are normally towed through the water by and form a part of a seismic detector cable. One of the primary problems with such cables is the necessity to maintain them at a selected and predetermined depth within the body of water through which they are being towed. It is not unusual for marine seismic detector cables to be 800 to 2,000 feet or more in length and the efficiency of the seismic survey is affected in large measure by the ability to maintain the detectors or hydrophones placed along the length of the cable at the same, predetermined depth. As a practical matter this is particularly difficult because the streamer, as the cable is called, cannot be made exactly buoyant since they are usually filled with oil, and also because temperature variations in the water cause changes in the density of the oil, thereby changing the bouyancy. Also, changes in the salinity of the sea water from one location to another cause variations in the bouyancy. This is especially true where the survey is being conducted offshore near the mouths of rivers where the fresh water from the river dilutes the sea water.

Various techniques and devices have been devised in an effort to maintain a seismic detector cable at predetermined depths but none have proven satisfactory. For example, weights have been tied to the cable at spaced intervals so as to made it negatively bouyant. Floats are then also tied to the cable at spaced intervals, the objective being that the floats would ride at or near the surface of the water so as to support the cable at a desired depth. Waves however affect adversely this kind of operation. Various other techniques have been tried in an effort to maintain the seismic detector cable at predetermined depths. A boom, for example, is sometimes lowered into the water at the stern of the towing vessel to hold the leading end of the detector cable at the desired depth but this of course provides no ability for the cable itself to compensate for changes in level in the floor below the water. The use of paravanes tied to the trailing end of a detector cable and having automatic depth control capabilities has been disclosed in the art, but such paravanes heretofore have been found to be unreliable in automatically controlling the depth capabilities of the cable. Furthermore, the paravanes are frequently subject to twisting motions of the detector cable which are caused by a change in direction of the towing vessel. Also they fail to respond smoothly to depth commands and frequently "flutter" from one position to another.

SUMMARY OF THE INVENTION

The paravane system of the present invention broadly contemplates a paravane for maintaining a seismic cable at a constant depth in the water. Each of the paravanes attached to the cable operates to ascend or descend independently of other paravanes on the cable thus maintaining the entire cable at a consistent depth throughout the cable length. In addition the cable itself is attached to the paravane in a manner permitting twisting of the cable with respect thereto without imparting the twisting forces to the paravane body.

A more specific form of the present invention contemplates a paravane housing in which there is contained an improved and highly responsive control mechanism for actuating to an ascending or descending position the paravane wings or diving planes.

The invention further contemplates the utilization of a plurality of paravanes in combination with a seismic detector cable to be towed through the water, each of the paravanes being journaled on the cable at spaced intervals so as to maintain the entire length of the cable at a desired depth.

An object of the invention is therefore to enable improved seismic surveying operations.

Another object of the invention is to maintain a marine seismic detector cable at a predetermined depth as the cable is being towed through the water.

Another object of this invention is to provide a paravane for a marine seismic detector cable which will not be affected by twisting of the cable.

Another object of the invention is to provide a paravane for a marine seismic detector cable which will maintain the cable, regardless of its length, at predetermined depths.

Another object of the invention is to provide an improved paravane having an internal control mechanism characterized by superior response capabilities and which is substantially devoid of flutter.

Still another object of the invention is to provide an improved paravane which is relatively inexpensive to manufacture, requires minimal maintenance due to simplicity of construction and is easy to operate.

These and numerous other features, advantages and objects of the invention will become more readily apparent upon reading of the following detailed description, claims and drawings, wherein like numerals denote like parts in the several views, and wherein:

DESCRIPTION OF THE PREFERRED EMBODIMENT OF THE INVENTION

Figure 1:
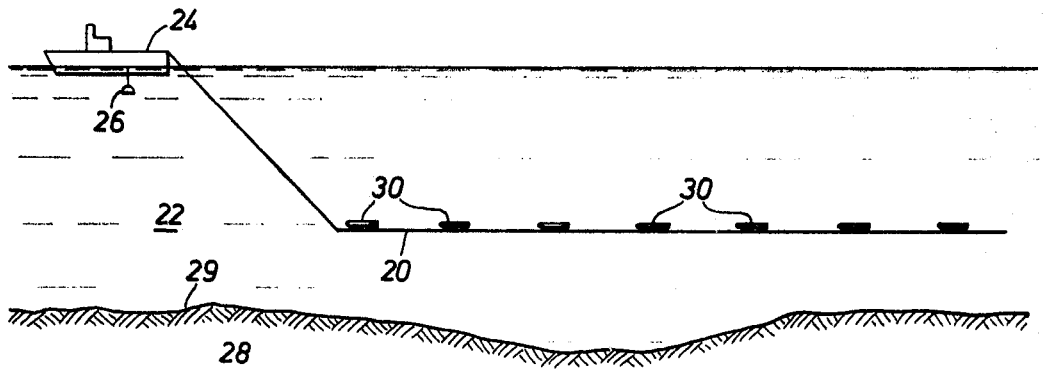
FIG. 1 is a schematic illustration of a seismic surveying system, including a detector cable being maintained at a predetermined depth in a body of water by a plurality of paravanes constructed in accordance with this invention.

Referring now to the drawings in detail, and in particular to FIG. 1, the reference numeral 20 designates a seismic detector cable being towed through a body of water 22 by a survey vessel 24. Also towed by the survey vessel 24 is a seismic energy source 26 for either continuously or periodically detonating energy so as to produce sound waves which enter the subsurface 28 below the water 22 as seismic signals. The seismic signals are reflected back upwardly. The reflected signals are then detected by a plurality of geophones or similar devices (not shown) carried in the cable 20 and are converted to electrical signals which are in turn conducted through the cable 20 to suitable recording equipment on vessel 24. It is the principal object of the present invention to maintain the cable 20 at a predetermined height above the water floor 29 this being accomplished by a plurality of the improved paravanes 30 secured in spaced relation along the length of the cable and which are disclosed in detail hereinafter.

Figure 2:
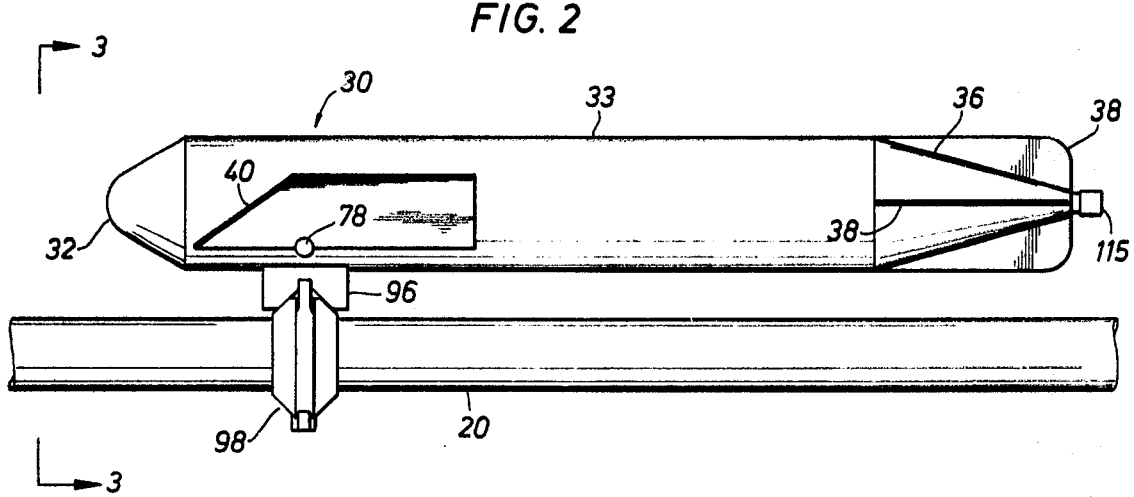
FIG. 2 is an elevation view of the preferred paravane structure mounted on said detector cable.
Figure 3:
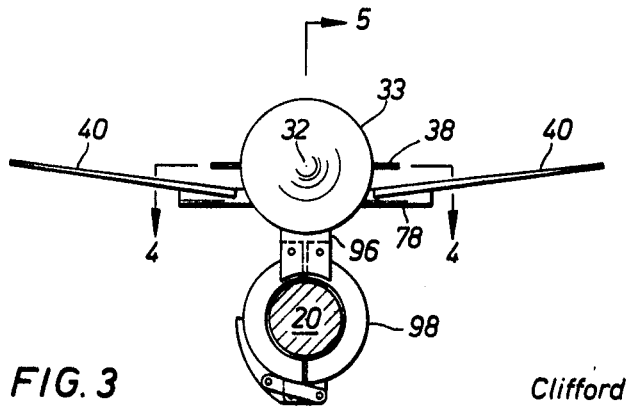
FIG. 3 is a front view of the paravane of FIG. 2 taken along the plane 3—3 thereof.
Figure 4:
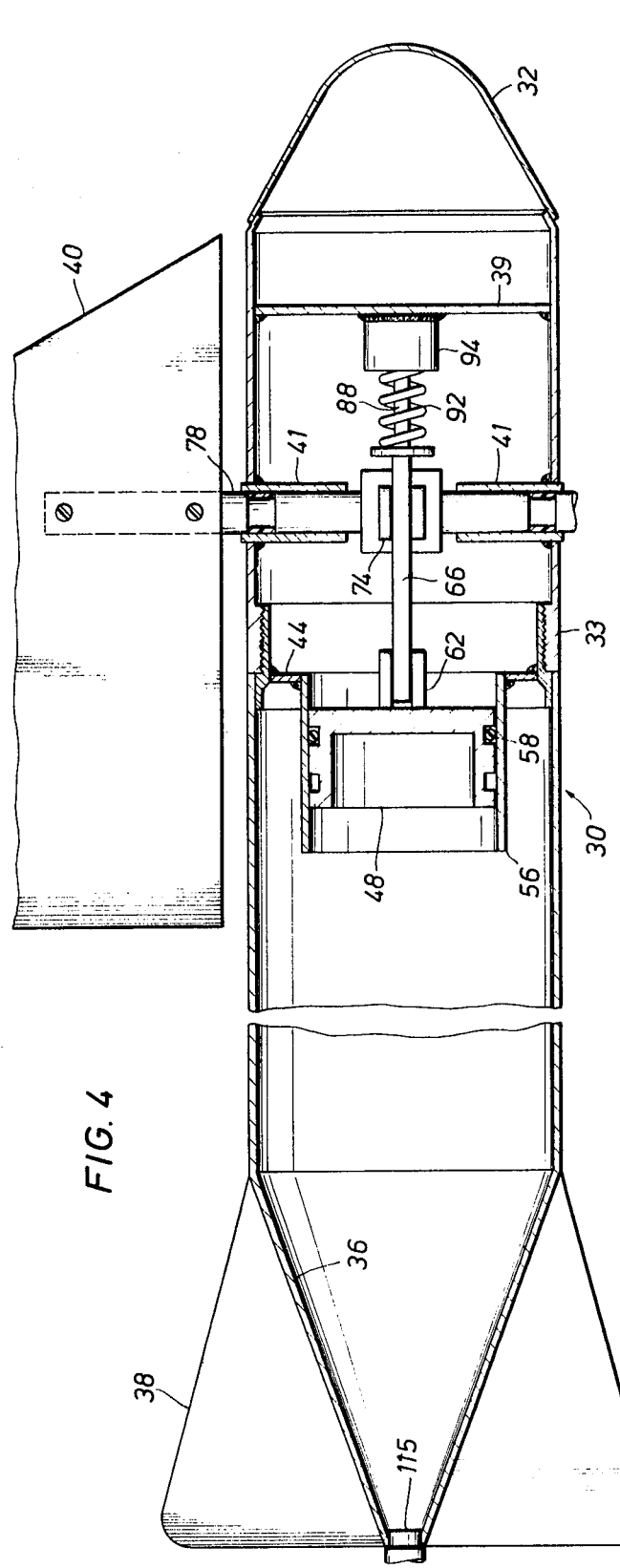
FIG. 4 is a sectional view along the plane 4—4 of FIG. 3 showing the actuator mechanism in neutral position.

With reference now to FIG. 2 there is shown the external structure and configuration of the paravane 30 which is connected to the seismic cable 20 by the coupling assembly 98. Although details of the coupling assembly 98 shall be explained hereinafter, it is readily seen that the coupling assembly is connected to the front-undersurface of the paravane 30 by means of a support block 96. The paravane consists of a nose section 32 of generally conical configuration, a body 33 and a tail section 36 to which is attached a plurality of stabilizing fin means 38. Pivotally connected to the body 33 proximate the front end thereof are the paravane wings 40, whose purpose it is to responsively control the depth at which the paravane travels and hence the depth at which the cable 20 moves while in the water. As shown in FIGS. 2 and 3 each of the wings 40 are adapted to pivot about the wing shaft 78 and are constructed so as to have a dihedral wing angle. The purpose of the dihedral wing angle is to resist extraneous forces that are introduced to the paravane as it moves through the water. Extraneous forces may be exemplified by current action which tends to move the paravane 30 off center or more specifically out of a parallel relationship with cable 20. Normally, currents introduced against the paravane would tend to force it around the cable 20 at some skewed angle with respect to the cable. The dihedral wings however move the paravane back to a top-parallel position with respect to the cable, this occurring regardless of the operational angle at which the wings are set.

The wing shaft 78 rotatably rests within support tubes 41, each of which are fixedly connected to the paravane internally thereof and coaxially aligned at a point generally below the midline of the paravane body. Fixedly connected to the wing shaft 78 at the midpoint thereof is a wing plate 74 (see FIG. 5), the function of which is to transmit movement of piston assembly 48 to the wings 40. This is accomplished by means of the connecting arm 66 which has at each end thereof an aperture. Cooperating apertures characterize each the wing plate 74 and a yoke 62 which is affixed to the piston assembly 48. Upon alignment of the yoke 62 with the arm 66 a pin 63 may be inserted into the cooperating apertures of each member. Similar alignment of the wing plate 74 and arm 66 permits insertion of a pin 70 through the two members so as to effect a coupling between the wings 40 and the piston assembly 48.

Figure 5:
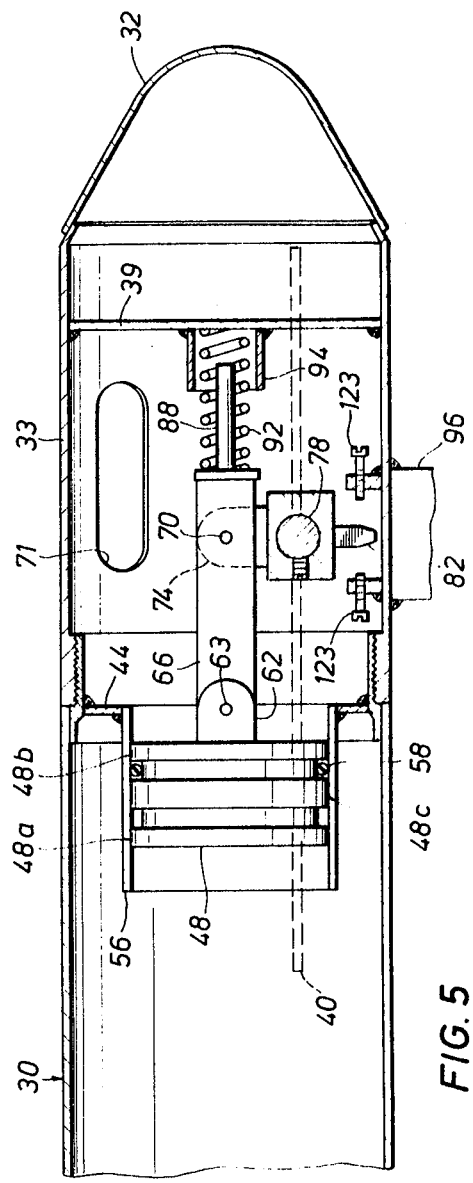
FIG. 5 is a sectional view along the plane 5—5 of FIG. 3.

The piston assembly consists of a rear head 48a, a front head 48b and an intermediate connecting neck 48c. Between the connecting neck 48c and front head 48b is positioned an O-ring 58 the purpose of which is to enhance movement of the piston within the cylinder 56 while at the same time obstructing the flow of air from the pressurized container of the paravane body, all as described hereinafter. The yoke member 62 is integrally attached to front head 48b as best shown in FIG. 5. Cylinder 56 likewise is integrally connected to a rear bulkhead 44 within the paravane body. In this manner the cylinder is fixedly positioned with respect to the paravane body so as to permit only axial movement of the piston therein.

Integrally attached interiorly of the paravane proximate the nose 32 is a front bulkhead 39. The front bulkhead 39 and rear bulkhead 44 define an interior volume which is adapted to receive and be filled with the water in which the paravane is moving. The water enters into the enclosed area via the ports or windows 71 in the paravane body. The pressure which is produced by the water acts upon the wall of front head 48b of piston assembly 48 and therefore tends to move the piston assembly rearwardly of the paravane.

Acting in conjunction with the water pressure is a guide rod 88 which is axially disposed and fixedly connected to the front end of arm 66. The guide rod is adapted to move within a coil spring 92 which is supported in a cup member 94. The cup is in turn fixedly positioned on front bulkhead 39 so as to thereby provide a receptacle for the guide rod 88 while at the same time supporting the coil spring which is adapted to maintain the wing shaft and hence the wings 40 in a normal position.

Figure 7:
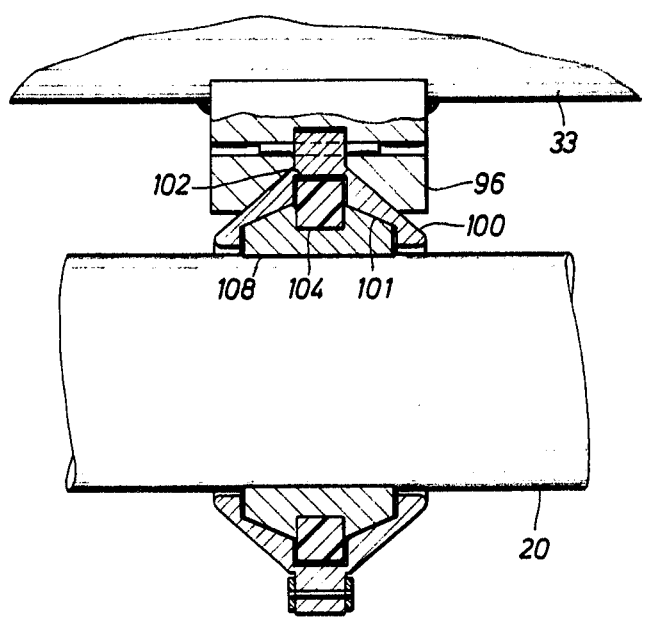
FIG. 7 is a sectional view along the plane 7—7 of FIG. 3 showing the means for coupling the cable to the paravane.
Figure 8:
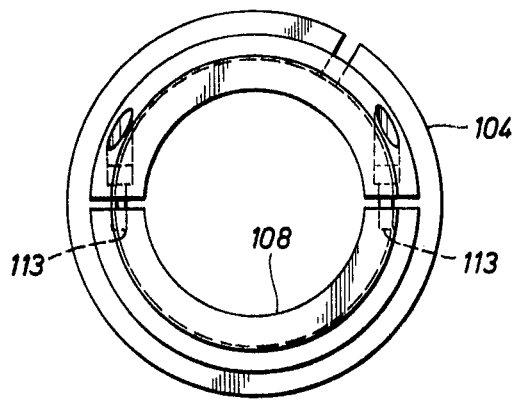
FIG. 8 is a frontal view of the coupling means of FIG. 7.

Integrally connected to the bottom surface of the paravane body is the support block 96. As best shown in FIGS. 7 and 8 the support block 96 is adapted to receive an outer race member 100. The outer race member is characterized by an inner V-shaped surface 101 having a recess 102 at the apex thereof. An inner race member 108 is fixedly connected to the cable 20 and is adapted to cooperatively engage a bearing means 104 of square configuration which fits into a mating recess in the inner bearing 108 and also the recess 102 in the outer race 100. The bearing means 104 characteristically may consist of a material having low coefficient of friction such as Teflon or the like. As best shown in FIG. 8 the outer race 100 is of split configuration, each of the portions thereof being connected to one another by recessed screw means 113. It will thus be recognized that the cable is movable with respect to the paravane attached thereto so that the paravane can freely rotate about the circumference of the cable as a consequence of the low friction bearing means 104. In this way the application of extraneous forces such as currents to the body of the paravane, which forces tend to move the paravane away from its parallel relation with cable 20 are easily compensated by action of the dihedral wings and their ability to move the paravane, in conjunction with the dual-race coupling means, back into a parallel position with respect to the cable thereby maintaining the cable at a constant depth.

Figure 6:
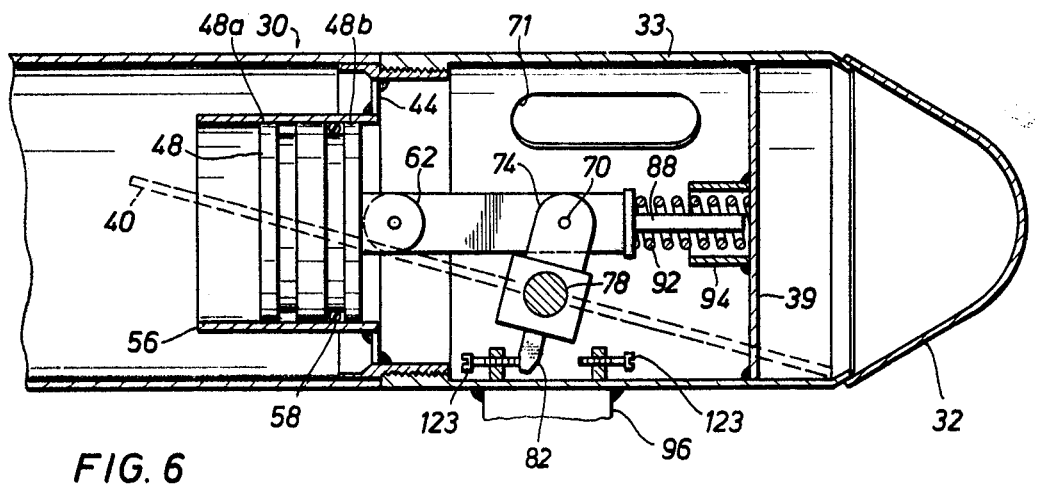
FIG. 6 is a cross-sectional view showing the mechanism of FIG. 5 actuating the wings of the paravane into a diving position.

In operation the improved paravane of the invention is filled with a predetermined quantity of air through the conduit means 115 at the rear thereof. The pressure is increased in the volume behind the rear bulkhead 44 to a predetermined level in accordance with the depth at which the cable is intended to be towed. Since the specific gravity of water is well known the water pressure at any given depth is easily calculable. In order to maintain the wings 40 in a horizontal position such as is shown in FIG. 5 one need only calculate the water pressure at a given depth and add to it the spring pressure exerted by coil spring 92. The combinative force of these two acts upon the surface of front head 48b so as to tend to move the piston assembly 48 backwardly in the paravane toward the tail section 36. By pressurizing the volume behind rear bulkhead 44 with an air pressure equal to the combined forces operating on front head 48b the wing 40 will be caused to reside in a normally horizontal position. Until the cable reaches its predetermined depth however the wings 40 will move to a diving plane (see FIG. 6) as a consequence of the air pressure acting upon the piston head 48a. Since this pressure exceeds the water pressure acting on head 48b the piston will move the wing shaft clockwise thus tilting the wings around the axis of the wing shaft. Conversely if the cable should descend below the predetermined depth the water pressure in combination with the spring force will move the piston backward toward the tail section thus rotating the wing shaft 78 in a counterclockwise manner thereby moving the wings to a climbing position. In either event it may readily be seen that the maximum climbing and/or diving planes may be adjustably determined by set screws 123. The set screws simply act to limit maximum movement of the wing shaft due to their contact with the limit pin 82 which is fixedly connected to the lower portion of wing plate 74.

In light of the above disclosure the present paravane device may predictably be operated at any predetermined level by simply varying the pressure through inlet 115. It will thus be apparent that the present invention will effectively maintain a marine seismic detector cable at a predetermined depth in water as the cable is being towed therethrough. The noise received heretofore by the detectors in the cable will be substantially reduced over previous operating techniques because of the unique exterior universally oriented coupling means which effectively obviates twisting of the cable such as when the direction of the surveying vessel is changed. The simple mechanical connections which actuate the wings to and from their various positions is substantially free of maintenance and devoid of potential mechanical failure.

Changes may be made in the various arrangements or parts or elements or in the combinations thereof as heretofore set forth in the specification and shown in the drawings. It is understood however that changes may be made in the disclosure without departing from the spirit and scope of the invention as defined in the following claims.

That which is claimed and desired to be secured by United States Letters Patent is:

1. A paravane device for use with a seismic cable being towed through a body of water and serving to maintain the cable at a predetermined depth in the water during seismic operations, the improvement comprising;

a paravane body having a first compartment adapted to receive a fluid at predetermined pressure therein, the pressure being calculated to correspond to the pressure of the water in which the body is to operate at some designated depth, a second compartment, the interior of said second compartment being in communication with the water in which the body is to operate, a cylinder spaced from said body and coaxial therewith and extending between said compartments, a longitudinally and axially extending piston with said cylinder, said piston comprising a front head and a rear head, said front head communicating with said second compartment and said rear head communicating with said first compartment, said piston being responsive to the superior pressure in either of said compartments, wing means movably affixed to the paravane device for imparting a climbing or diving mode thereto and, coupling means operatively connecting said wing means to said front head of said piston so that superior pressure in either of said compartments causes a correlative movement of said wing means, thereby resulting in alternating climbing or diving of the paravane.

2. The paravane device of claim 1 wherein said wing means consist of at least two wing members oppositely disposed on either side of the body of the paravane, said wing members having a dihedral characteristic so that forces imparted to the body during movement are more effectively resisted, thereby allowing for more linear movement of the paravane.

3. The paravane device of claim 1 in which the coupling means includes guide means for insuring effective movement of the piston and proper transmission of the movement to the wing members.

4. The paravane device of claim 1 in which adjustable limit means are disposed within the paravane body for substantially restricting pivotal movement of the wing members beyond predetermined angles of ascent or descent.

5. The paravane device of claim 2 in which the coupling means includes guide means for insuring effective movement of the piston and proper transmission of the movement to the wing members.

6. The paravane device of claim 5 wherein adjustable limit means are disposed within the paravane body for substantially restricting pivotal movement of the wing members beyond predetermined angles of ascent and descent.

7. The paravane device of claim 1 wherein there is included means affixed to the paravane for connecting it to the seismic cable, said connection means being characterized by race means therein which provide for rotational but nonlinear movement of the paravane with respect to the cable, thereby precluding entanglement of the cable and paravane during their movement through the water.

8. The paravane device of claim 2 wherein the dihedral wing members have a sweptback configuration so that external forces applied to the body are more effectively resisted, thereby also enhancing linear movement of the paravane at a constant depth because of the cooperative action of the sweptback dihedral wings and the rotational connection means between the paravane and cable.